(12) United States Patent
Campion

(10) Patent No.: US 6,644,247 B2
(45) Date of Patent: Nov. 11, 2003

(54) FREQUENCY SWITCHING SYSTEMS FOR PORTABLE POWER MODULES

(75) Inventor: Edmund Campion, Encino, CA (US)

(73) Assignee: General Electric Company, Schenectady, NY (US)

( * ) Notice: Subject to any disclaimer, the term of this patent is extended or adjusted under 35 U.S.C. 154(b) by 17 days.

(21) Appl. No.: 10/002,648

(22) Filed: Oct. 23, 2001

(65) Prior Publication Data

US 2003/0030281 A1 Feb. 13, 2003

Related U.S. Application Data

(60) Provisional application No. 60/310,860, filed on Aug. 8, 2001.

(51) Int. Cl.⁷ ................................................ F02B 63/00
(52) U.S. Cl. ............................. 123/2; 290/51; 29/401.1
(58) Field of Search ........................... 123/2; 290/40 R, 290/51; 29/401.1

(56) References Cited

U.S. PATENT DOCUMENTS 6,450,133 B1    9/2002  Bernard et al.

Primary Examiner—Noah P. Kamen
(74) Attorney, Agent, or Firm—Perkins Coie LLP

(57) ABSTRACT

Frequency switching systems for changing the frequency of electrical power provided by portable power modules trailerable over public roads and capable of providing at least approximately one megawatt of electrical power. In one embodiment, the portable power module includes a shipping container housing a gaseous fuel motor drivably connected to an electrical generator. The frequency switching system includes a turbocharger operatively connected to the motor and having interchangeable components that allow selecting a first or second turbocharger configuration. The selected turbocharger configuration determines the RPM of the motor, which in turn determines the frequency of the electrical power produced by the generator. In one embodiment, the first turbocharger configuration results in a motor speed of 1500 RPM and a frequency of 50 Hz, and the second turbocharger configuration results in a motor speed of 1800 RPM and a frequency of 60 Hz.

26 Claims, 10 Drawing Sheets

FREQUENCY SWITCHING SYSTEMS FOR PORTABLE POWER MODULES

CROSS-REFERENCE TO RELATED APPLICATION(S)

This application claims the benefit of pending U.S. Provisional Patent Application No. 60/310,860 entitled "PORTABLE POWER MODULES AND RELATED SYSTEMS," which was filed Aug. 8, 2001, and is incorporated herein by reference. This application cross-references pending U.S. patent application entitled "AIR DUCTS FOR PORTABLE POWER MODULES," (Attorney Docket No. 243768079US); "CONTAINMENT SYSTEMS FOR PORTABLE POWER MODULES," (Attorney Docket No. 243768080US): U.S. patent application entitled "AIR PROVISION SYSTEMS FOR PORTABLE POWER MODULES," (Attorney Docket No. 243768081US); U.S. patent application entitled "PORTABLE POWER MODULES AND RELATED SYSTEMS," (Attorney Docket No. 243768083US1), filed concurrently herewith and incorporated herein by reference.

BACKGROUND

The described technology relates generally to systems for switching the frequency of electrical power provided by portable power modules and, more particularly, to systems for switching the frequency of electrical power provided by portable power modules trailerable over public roads and capable of providing at least approximately one megawatt of electrical power.

There are many occasions when temporary electrical power may be required. Common examples include entertainment and special events at large venues. As the demand for energy quickly outstrips supply, however, temporary electrical power is being used in a number of less common applications. For example, as electrical outages occur with increasing regularity, many commercial enterprises are also turning to temporary electrical power to meet their demands during peak usage periods.

A number of prior art approaches have been developed to meet the rising demand for temporary electrical power. One such approach is a mobile system that generates electrical power using a liquid fuel motor, such as a diesel fuel motor, drivably coupled to an electrical generator. This system is capable of producing up to two megawatts of electrical power and can be housed within a standard shipping container, such as a standard 40-foot ISO (International Standard Organization) shipping container. Enclosure within a standard shipping container enables this system to be quickly deployed to remote job sites using a conventional transport vehicle, such as a typical tractor truck.

Temporary electrical power systems that use liquid fuels, such as petroleum-based fuels, however, have a number of drawbacks. One drawback is associated with the motor exhaust, which may include undesirable effluents. Another drawback is associated with the expense of procuring and storing the necessary quantities of liquid fuel. As a result of these drawbacks, attempts have been made to develop temporary electrical power systems that use gaseous fuels, such as natural gas.

One such attempt at a gaseous fuel system is illustrated in FIG. 1, which shows a side elevational view of a power generation system 100 in its normal operating configuration. The power generation system 100 includes a motor 110 drivably coupled to a generator 120. The motor 110 is configured to burn a gaseous fuel, such as natural gas, and is capable of mechanically driving the generator 120 to produce an electrical power output on the order of one megawatt. The motor 110 and generator 120 are housed within a standard 40 foot ISO shipping container 102, which is supported by a trailer 103 having a tandem axle rear wheel-set 104. The trailer 103 can be coupled to a typical transport vehicle, such as a tractor truck, for movement of the container 102 between job sites.

Unlike their diesel fuel powered counterparts, gaseous fuel power generation systems of the prior art, such as that shown in FIG. 1, have an exhaust gas silencer 114 and a motor coolant radiator 118 installed on top of the container 102 during normal operation. This configuration is dictated by a number of factors, including the size of the gaseous fuel motor 110 and the amount of heat it gives off during operation. The size of the motor 110 reduces the space available inside the container 102 for the exhaust gas silencer 114 and the radiator 118, and the large amount of heat generated by the motor creates an unfavorable thermal environment inside the container for the radiator. Although the exhaust gas silencer 114 and the radiator 118 are installed on top of the container 102 during normal operation, during movement between job sites these components are removed from the top of the container to facilitate travel over public roads.

Electrical equipment in different parts of the world often use different frequencies of electrical power. For example, electrical equipment in Europe is generally configured to use 50 Hz power while electrical equipment in the United States is generally configured to use 60 Hz power. The prior art power generation system 100 can be provided in one of two configurations depending on the frequency of electrical power output desired. In the 50 Hz configuration, the motor 110 is connected directly to the generator 120 with a coupling so that the generator turns at the same number of revolutions per minute (RPM) as the motor. In this configuration, the motor 110 and the generator 120 may both turn at 1500 RPM to produce electrical power at 50 Hz. In the 60 Hz configuration, however, a gearbox is interconnected between the motor 110 and the gearbox 120 to step up the generator RPMs relative to the motor. In this configuration, the motor 110 may turn at 1500 RPM and the generator 120 may turn at 1800 RPM to produce electrical power at 60 Hz.

A number of shortcomings are associated with the method for changing the frequency of electrical power provided by the power generation system 100. For example, if the power generation system 100 is configured for use in Europe, then it will not have a gearbox installed between the motor 110 and the generator 120 and the motor and generator will both operate at 1500 RPM to produce power at 50 Hz. However, if it is later desired to use this power generation system in the United States, then a gearbox will have to be installed between the motor 110 and the generator 120 so that the generator will operate at 1800 RPM and produce power at 60 Hz when the motor is operating at 1500 RPM. If still later this power generation system is returned to Europe, the gearbox will accordingly have to be removed. Removing and installing this gearbox depending on where the power generation system 100 is located is a time-consuming process that adds to the initial expense of procuring the gearbox.

Additional shortcomings are associated with the prior art power generation system 100. One shortcoming is the number of transport vehicles required to deploy the power generation system 100 to a given job site. For example, although the container 102 with the motor 110 and the generator 120 inside can be transported to the job site using only one transport vehicle, an additional transport vehicle is also required to carry the exhaust gas silencer 114 and the radiator 118. In addition, once at the job site, both the exhaust gas silencer 114 and the radiator 118 need to be installed on top of the container 102 and the necessary structural and functional interfaces connected and verified. The exhaust gas silencer 114 and the radiator 118 must then be removed from the top of the container 102 when it comes time to move the power generation system 100 to a second job site.

The foregoing shortcomings of the prior art power generation system 100 offset many of the benefits associated with such a system. Therefore, a temporary electrical power generation system that uses gaseous fuel and has the ability to provide at least approximately one megawatt of electrical power without these shortcomings would be desirable.

DETAILED DESCRIPTION

The following disclosure provides a detailed description of systems for switching the frequency of electrical power provided by portable power modules. In one embodiment, these frequency switching systems can be used with portable power modules trailerable over public roads and capable of providing at least approximately one megawatt of electrical power. In one aspect of this embodiment, the portable power module includes a shipping container housing a gaseous fuel motor drivably connected to an electrical generator. The frequency switching system includes a turbocharger operatively connected to the motor and having interchangeable components that allow selecting a first or second turbocharger configuration. The selected turbocharger configuration affects the RPM of the motor, which in turn determines the frequency of electrical power produced by the generator.

In one embodiment, the first turbocharger configuration results in a motor speed of 1500 RPM and a frequency of 50 Hz, and the second turbocharger configuration results in a motor speed of 1800 RPM and a frequency of 60 Hz. In other embodiments, the first and second turbocharger configurations can result in other motor speeds and other corresponding frequencies.

Many specific details of certain embodiments of the invention are set forth in the following description to provide a thorough understanding of these embodiments. One skilled in the relevant art, however, will understand that the present invention may have additional embodiments, or that the invention may be practiced without several of the details described below. In other instances, structures and functions well known to those of ordinary skill in the relevant art have not been shown or described in detail here to avoid unnecessarily obscuring the description of the embodiments of the invention.

Figure 2:
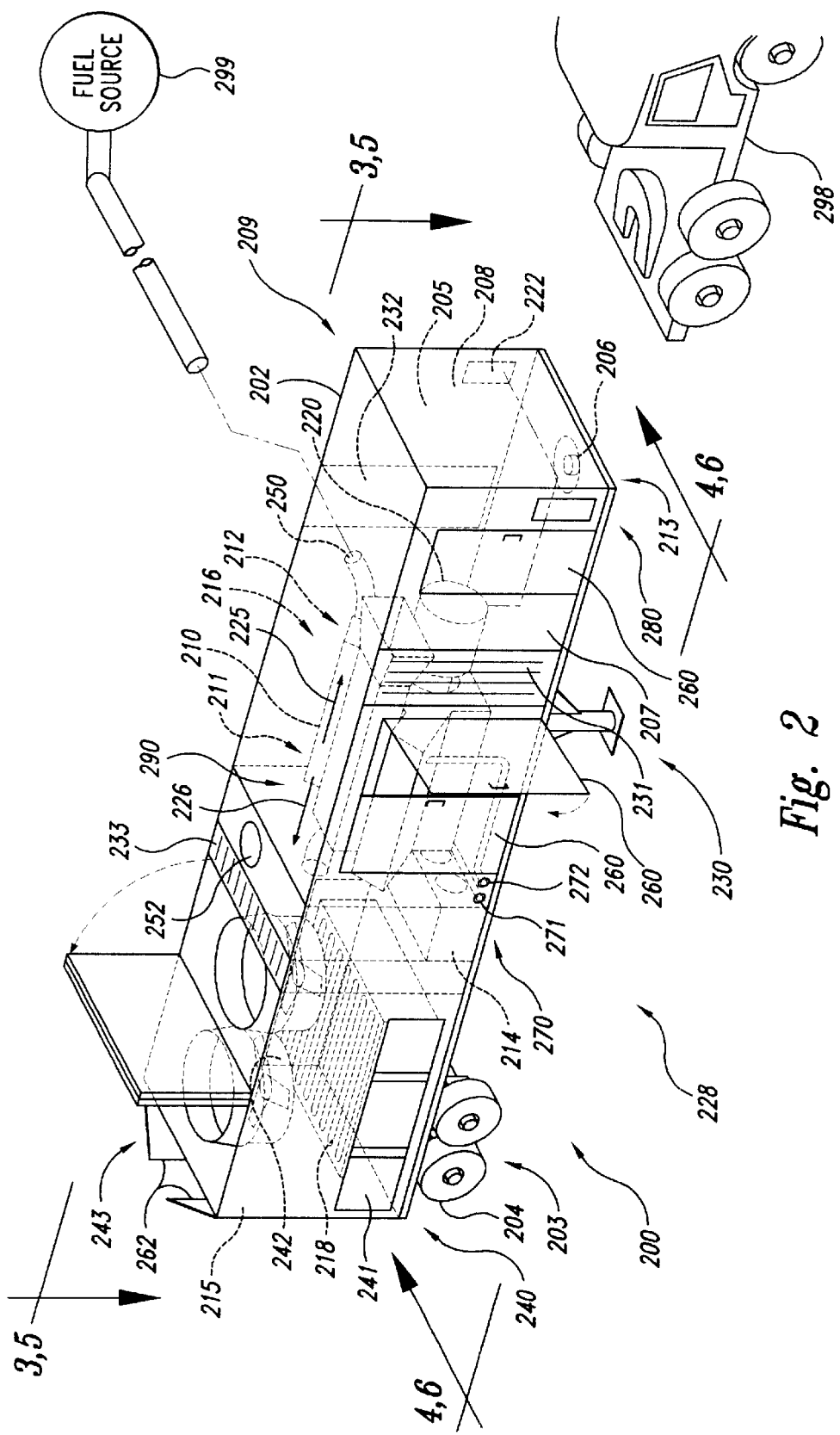
FIG. 2 is an isometric view of a portable power module in accordance with an embodiment of the invention.

FIG. 2 is an isometric view of a portable power module 200 in accordance with an embodiment of the invention. In one aspect of this embodiment, the portable power module 200 includes a container 202 defining a first interior portion, or motor compartment 205, toward a first direction 225, and a second interior portion, or radiator compartment 215, toward a second direction 226 opposite to the first direction. In the motor compartment 205, the container 202 houses a gaseous fuel motor 210 drivably connected to a generator 220 that provides electrical power to an electrical outlet 222. In the radiator compartment 215, the container 202 houses a horizontally situated radiator 218 connected in flow communication with a motor coolant jacket 212. When the motor 210 is operating, the radiator 218 receives heated coolant from the coolant jacket 212 and returns cooled coolant to the coolant jacket. A rectangular exhaust gas silencer 214 connected in flow communication with a motor exhaust gas manifold 216 receives exhaust gases from the exhaust gas manifold and vertically discharges the gases through an exhaust gas outlet 252. In a further aspect of this embodiment, the motor 210, the generator 220, the radiator 218 and exhaust gas silencer 214 are all positioned within the container 202 when the portable power module 200 is in a normal operating configuration. As used throughout this disclosure, the phrase "normal operating configuration" refers to a configuration in which the portable power module 200 can provide at least approximately one megawatt of electrical power.

The container 202 includes a first side portion 207 spaced apart from an opposing second side portion 208 and a bottom portion 213 spaced apart from an opposing top portion 209. The bottom and top portions 213 and 209 are connected to the first and second side portions 207 and 208 to at least partially define the motor compartment 205 and the radiator compartment 215. The container 202 is supported on a conventional trailer 203 having a tandem axle rear wheel-set 204 for mobility. A trailer coupling 206 is forwardly positioned on a bottom portion of the trailer 203 for releasably connecting the trailer to a suitable transport vehicle 298, such as a tractor truck, for movement of the portable power module on public roads.

In one embodiment, the container 202 has the dimensions of a standard 40-foot ISO certified steel container. As is known, standard 40-foot ISO containers such as this are a ubiquitous form of shipping container often seen on roadway, railway and maritime conveyances. The standard 40-foot ISO container has a length dimension of forty feet, a width dimension of 8 feet and a height dimension of 8.5 feet.

In one embodiment, an air provision system 228 provides necessary ambient air to the portable power module 200 during operation. The air provision system 228 includes a first air circuit 230 and a second air circuit 240. The first air circuit 230 provides ambient air to the motor compartment 205 through a first air inlet 231 positioned on the first container side 207 and an opposing second air inlet 232 positioned on the second container side 208. This ambient air serves a number of purposes, including cooling the generator 220, providing air to the motor 210 for combustion, and providing general ventilation to the motor compartment 205. As will be explained in greater detail below, a portion of the ambient air entering the motor compartment 205 through the first and second air inlets 231 and 232 exits the portable power module 200 through a first air outlet 233 positioned on the top portion 209 of the container 202.

The second air circuit 240 draws ambient air into the radiator compartment 215 through a third air inlet 241 positioned on the first container side 207 and an opposing fourth air inlet 242 positioned on the second container side 208. This ambient air passes over the radiator 218 before discharging vertically through a second air outlet 243 positioned on the top portion 209 of the container 202. Accordingly, the ambient air provided by the second air circuit 240 convects heat away from the radiator 218 to lower the temperature of coolant received from the coolant jacket 212 before returning the cooled coolant to the coolant jacket. As will be explained in greater detail below, the container 202 may be adapted to include one or more occluding members optionally positionable over the second air outlet 243 to prevent the ingress of rain or other undesirable substances.

The portable power module 200 can include various interfaces positioned on the container 202 to operatively and releasably connect the portable power module to other systems. For example, a fuel inlet 250 is provided on the second container side 208 for receiving gaseous fuel, such as natural gas, propane, or methane, from a fuel source 299 and providing the gaseous fuel to the motor 210. A heat recovery system 270 can be provided on the first container side 207 to take advantage of the heat generated by the motor 210. The heat recovery system 270 includes a heat recovery outlet 271 and a heat recovery return 272. Both the heat recovery outlet 271 and the heat recovery return 272 are connected in flow communication to the coolant jacket 212 on the motor 210. In one aspect of this embodiment, the heat recovery outlet 271 and the heat recovery return 272 are releasably connectable to a separate circulation system (not shown) for circulating the hot coolant produced by the motor 210. This hot coolant flows out through the heat recovery outlet 271 and can provide heat for various useful purposes before returning to the coolant jacket 212 through the heat recovery return 272.

The portable power module 200 of the illustrated embodiment can also include a number of doors for operator access. For example, one or more side doors 260 can be provided so that an operator can enter the motor compartment 205 to operate the portable power module 200 or to provide maintenance. Similarly, one or more end doors 262 can also be provided for operator access to the radiator 218 and related systems.

A containment system 280 may be disposed adjacent to the bottom portion 213 of the container 202. In the illustrated embodiment, the containment system 280 extends substantially over the entire planform of the container 202 to prevent spillage of fluids from the portable power module 200 onto adjacent premises. For example, the containment system 280 may capture fuels or lubricants that may leak from the motor 210 over time. In addition, the containment system 280 may also capture rainwater that has entered the portable power module 200 through the second air outlet 243 or other apertures.

As those of ordinary skill in the relevant art are aware, different parts of the world use different frequencies of electrical power for their electrical equipment. For example, much of the world (e.g., Europe) uses 50 Hz electrical power, while other parts (e.g., the United States) use 60 Hz. To accommodate this difference, the portable power module 200 of the illustrated embodiment includes a frequency switching system 290 for selectively switching the frequency of the electrical power output between 50 Hz and 60 Hz. In one embodiment, the frequency switching system 290 includes a turbocharger 211 that is operatively connected to the motor 210 and has interchangeable components that allow selecting between a 50 Hz configuration or a 60 Hz configuration. The selected turbocharger configuration determines the speed, or the revolutions per minute (RPM), of the motor 210, which in turn determines the frequency of the electrical power generated by the generator 220. Accordingly, the electrical power provided by the portable power module 200 can be provided in either 50 Hz or 60 Hz form by selecting the appropriate turbocharger configuration.

The portable power unit 200 of the illustrated embodiment can use a number of different types of motors and generators. For example, in one embodiment, the portable power module 200 can use a gaseous fuel-burning reciprocating motor, such as the J 320 GS-B85/05 motor manufactured by Jenbacher AG. In another aspect of this embodiment, the generator can be an HCl' 734 F2 generator manufactured by the Stamford Company. In other embodiments, other motors and other generators can be employed.

In one embodiment, the portable power module 200 can be used to provide temporary electrical power at a remote site as follows. After a customer has placed an order for temporary electrical power, the operator deploys the portable power module 200 to the designated site. Deployment includes releasably attaching the coupling 206 to the transport vehicle 298 and transporting the portable power module 200 to the site. During transport, the various doors (e.g., 260, 262) and covers (e.g., over the first air outlet 233, the second air outlet 243, and the exhaust gas outlet 252) should be closed. Upon arrival at the site, the transport vehicle 298 can be uncoupled from the portable power module 200 and can leave the site. Before operating the portable power module 200, the fuel source 299, such as a natural gas source, is connected to the fuel inlet 250, and the second air outlet 243, the exhaust gas outlet 252, and the first air outlet 233 are uncovered. In this normal operating configuration, the motor 210 can be started and the portable power module 200 can provide at least approximately one megawatt of electrical power to the electrical outlet 222 for use by the customer.

Figure 1:
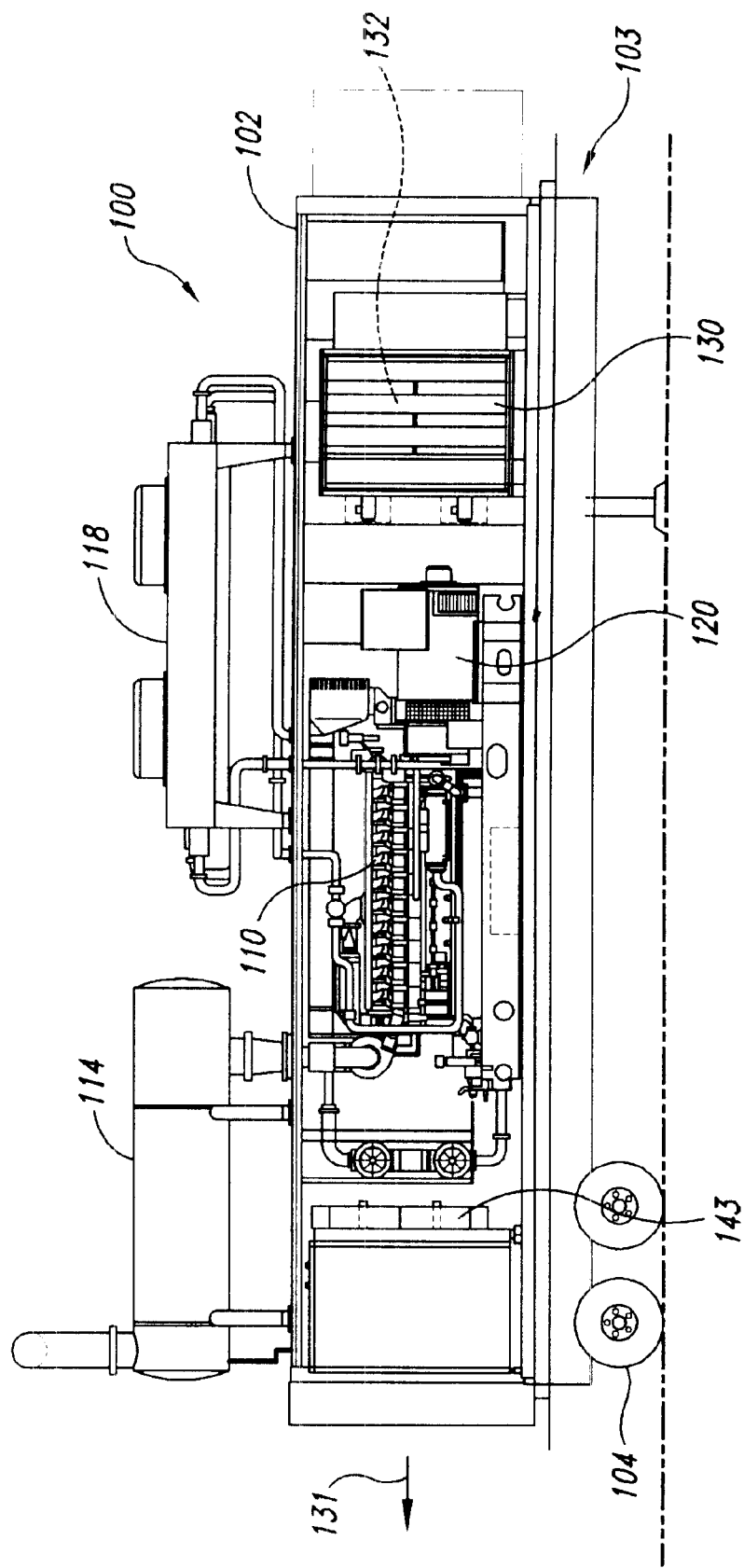
FIG. 1 illustrates an electrical power generation system in accordance with the prior art.

The portable power module 200 has a number of advantages over the power generation systems of the prior art, such as the prior art system shown in FIG. 1. For example, because the fully assembled, operable portable power module 200 fits entirely within a standard 40-foot ISO shipping container, it complies with applicable U.S. Department of Transportation (DOT) standards for travel over public roads. Further, in the embodiment illustrated in FIG. 2, the gross weight of the container 202 including its internal components does not exceed 53,000 pounds, and the portion of that 53,000 pounds that is positioned over the tandem rear axle wheel-set 204 does not exceed 34,000 pounds. As a result, the gross vehicle weight of the portable power module 200 combined with the transport vehicle (not shown) will usually not exceed 80,000 pounds, thereby complying with applicable DOT weight standards for travel over public roads. Because of these advantages, the portable power module 200 can be easily deployed to a remote job site over public roads using only a single transport vehicle. In addition, because the major systems associated with the portable power module 200 (e.g., motor 210, generator 220, radiator 218, exhaust gas silencer 214, etc.) are installed within the container 202 in their normal operating configuration, only minimal set-up and check-out of the systems is required at the site before operation.

A further advantage of the portable power module 200 is that, as presently configured, it can produce at least approximately one megawatt of electrical power while not generating excessive sound pressure levels. For example, the portable power module 200 of the illustrated embodiment is expected to not exceed a sound pressure level of approximately 74 db(A) at a distance of at least approximately 23 feet from the portable power module during normal operation. This ability to attenuate operational noise is attributable to the positioning of the various outlets (e.g., 233, 243, and 252) on the top portion 209 of the container 202 and other noise reduction features. As a result of the relatively low operating noise, the portable power module 200 is compatible for use in populated areas or other applications with noise restrictions.

A further advantage of the portable power module 200 is provided at least in part by the air provision system 228 that enables the portable power module to produce at least approximately one megawatt of electrical power in a wide range of ambient temperature conditions. For example, it is expected that the portable power module 200 can provide full-rated power at 50 Hz in 93 degree Fahrenheit ambient temperature conditions and at 60 Hz in 107 degree Fahrenheit ambient temperature conditions. In addition to the foregoing benefits, the portable power module 200 can also operate on gaseous fuel, such as natural gas, propane, or methane, rather than liquid fuel, such as diesel fuel. This further benefit means that the portable power module 200 may produce less of the undesirable effluents often associated with liquid fuels.

Figure 3:
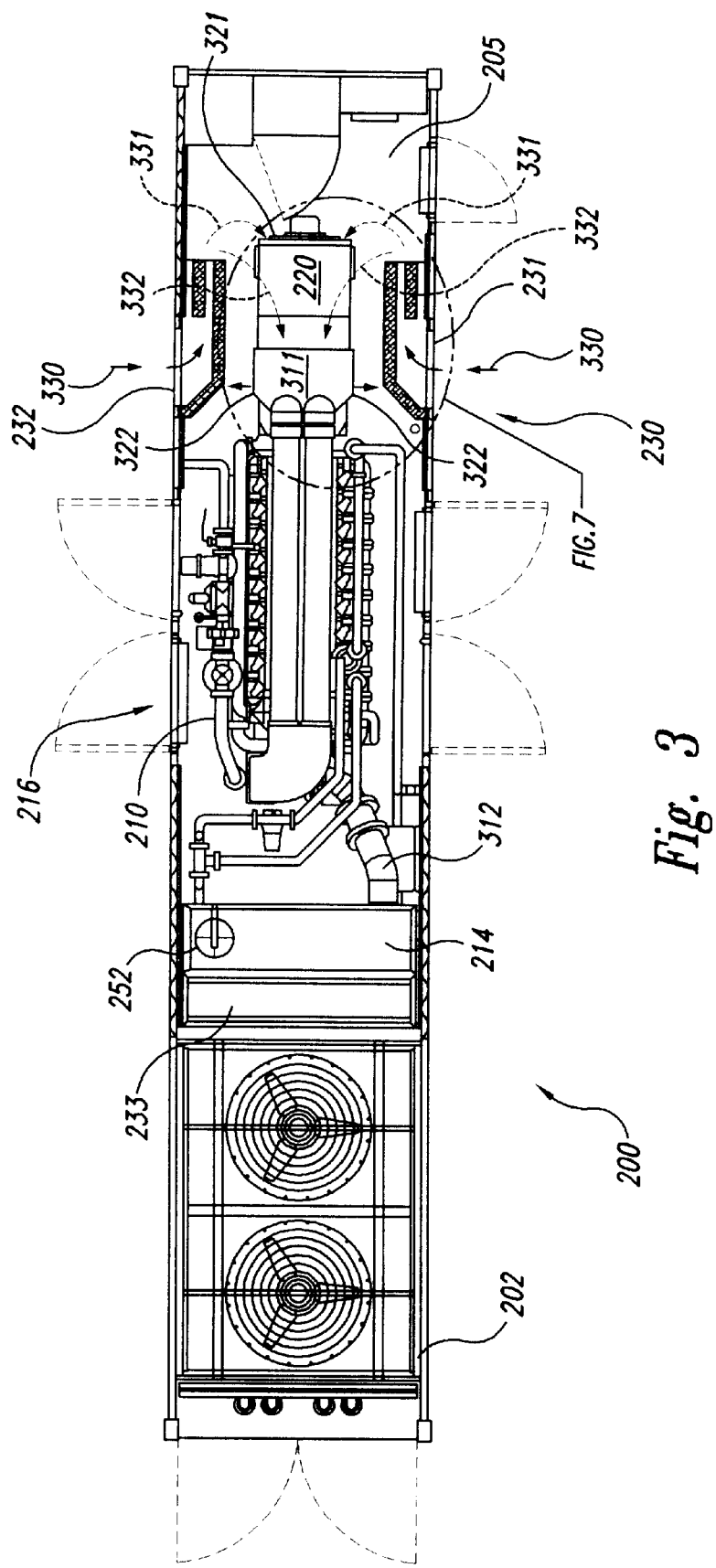
FIG. 3 is a top view of the portable power module of FIG. 2 taken substantially along line 3—3 in FIG. 2 with a roof panel removed for purposes of clarity.
Figure 4:
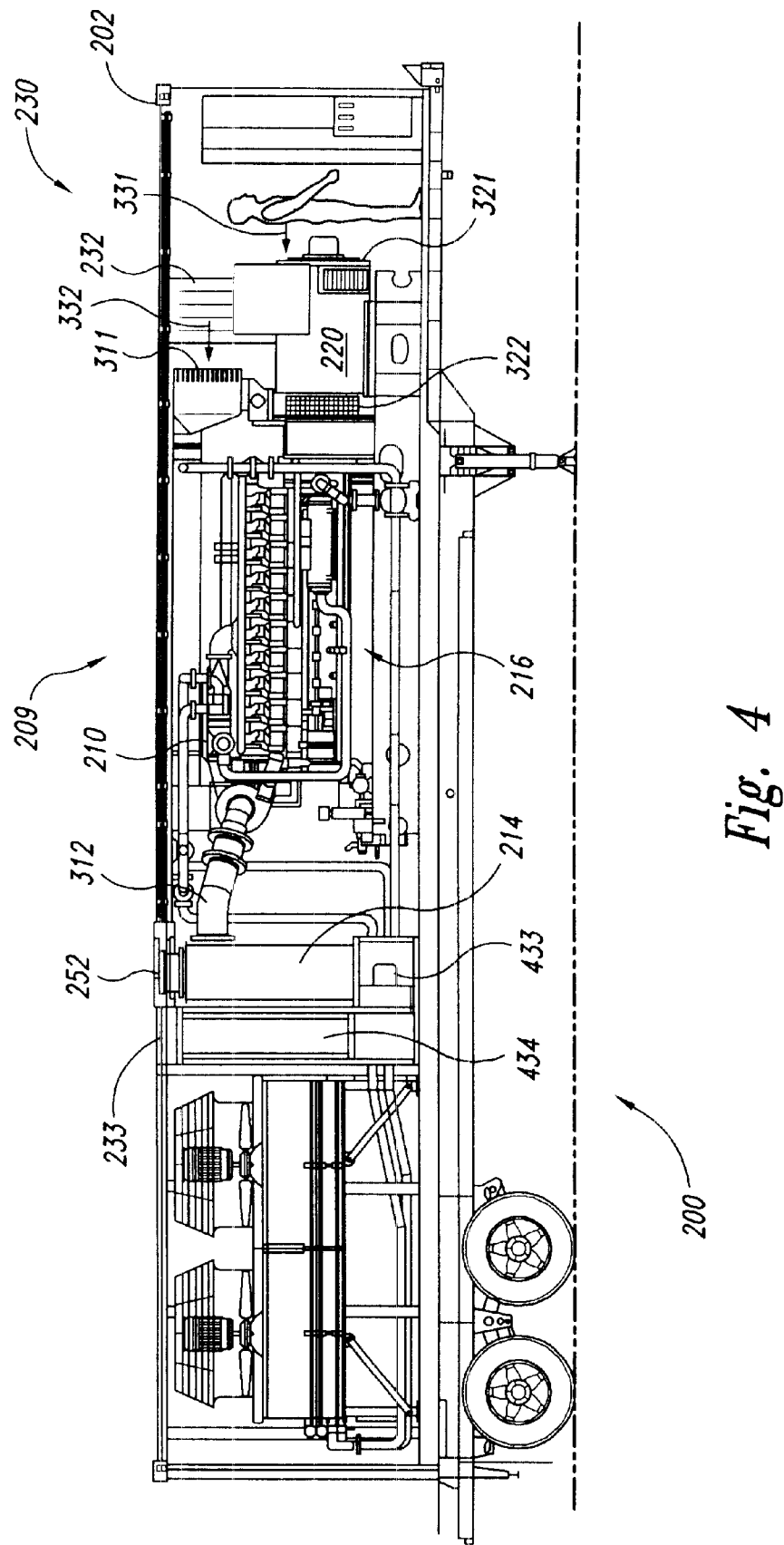
FIG. 4 is a side-elevational view of the portable power module of FIG. 2 taken substantially along line 4—4 in FIG. 2 with a side panel removed for purposes of clarity.

FIG. 3 is a top view of the portable power module 200 taken substantially along line 3—3 in FIG. 2, and FIG. 4 is a side-elevational view of the portable power module taken substantially along line 4—4 in FIG. 2. Portions of the container 202 are shown at least partially removed in FIGS. 3 and 4 for purposes of clarity. Collectively, FIGS. 3 and 4 illustrate various aspects of the first air circuit 230 in accordance with an embodiment of the invention.

As best seen in FIG. 3, a first air portion 330 enters the motor compartment 205 through the first air inlet 231 and the second air inlet 232. A first fraction 331 of the first air portion 330 is drawn into a generator air intake 321 to cool the generator 220. This generator cooling air is exhausted out of a generator air outlet 322, as shown in FIGS. 3 and 4. A second fraction 332 of the first air portion 330 is drawn into a combustion air intake 311 that provides air to the motor 210 for combustion. As shown in FIG. 4, the combustion air intake 311 is positioned upstream of the generator air outlet 322 to ensure fresh, cool air is provided to the motor 210 and not the warm air exhausting from the generator air outlet. After combustion, exhaust gases leaving the exhaust gas manifold 216 of the motor 210 pass through a circular exhaust gas duct 312 into the exhaust gas silencer 214 before being vertically discharged through the exhaust gas outlet 252.

A portion of the air entering the motor compartment 205 through the first and second air inlets 231 and 232 is not drawn into either the generator air intake 321 or the combustion air intake 311. Instead, this portion is used for general ventilation and cooling of the motor compartment 205 and is moved through the motor compartment by a first air moving system 433 (FIG. 4). The first air moving system 433 draws the air from the motor compartment 205 into a rectangular air outlet silencer 434 proximally disposed adjacent to the exhaust gas silencer 214. In one aspect of this embodiment, the first air moving system 433 can be a fan induction system positioned below the exhaust gas silencer 214 just upstream of the air outlet silencer 434. In another aspect of this embodiment, the air outlet silencer 434 is positioned in thermal proximity to the exhaust gas silencer 214 so that air passing through the air outlet silencer passes adjacent to the exhaust gas silencer 214 and convectively reduces the temperature of exhaust gasses passing through the adjacent exhaust gas silencer. Similarly, the proximity of the first air outlet 233 to the exhaust gas outlet 252 promotes mixing of cooling air with exhaust gases to further reduce the exhaust gas temperature exterior of the container 202.

One advantage of the first air circuit 230 of the embodiment shown in FIGS. 3 and 4 is the general compactness provided by the arrangement of the respective components. For example, rather than install an exhaust gas silencer on top of the container 202, the portable power module 200 of the present invention mounts the exhaust gas silencer 214 inside the container. As a result, the exhaust gas silencer configuration of the present invention does not require separate transportation to a job site nor does it require the extensive setup and check-out procedures often associated with prior art systems. Another advantage of the present invention results from locating the exhaust gas silencer 214 in thermal proximity to the air outlet silencer 434 to enhance the reduction of exhaust gas temperatures.

Figure 5:
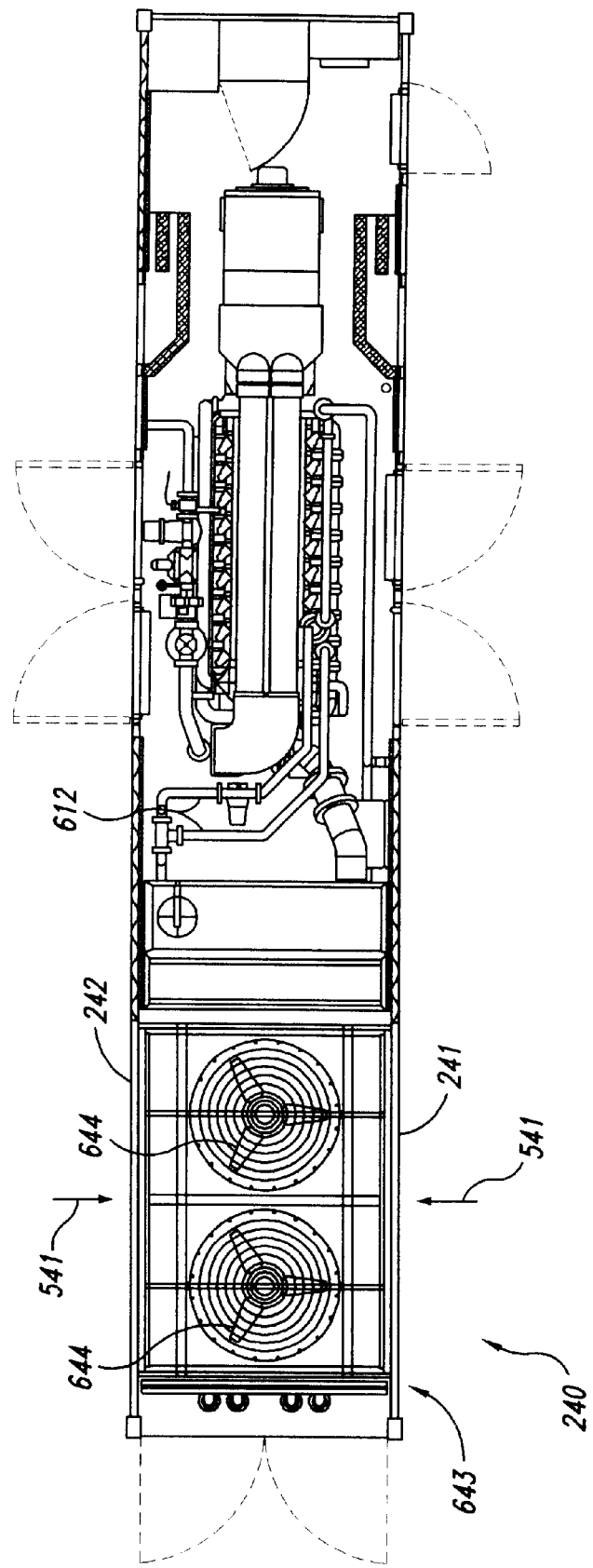
FIG. 5 is a top view of the portable power module of FIG. 2 taken substantially along line 5—5 in FIG. 2 with a roof panel removed for purposes of clarity.
Figure 6:
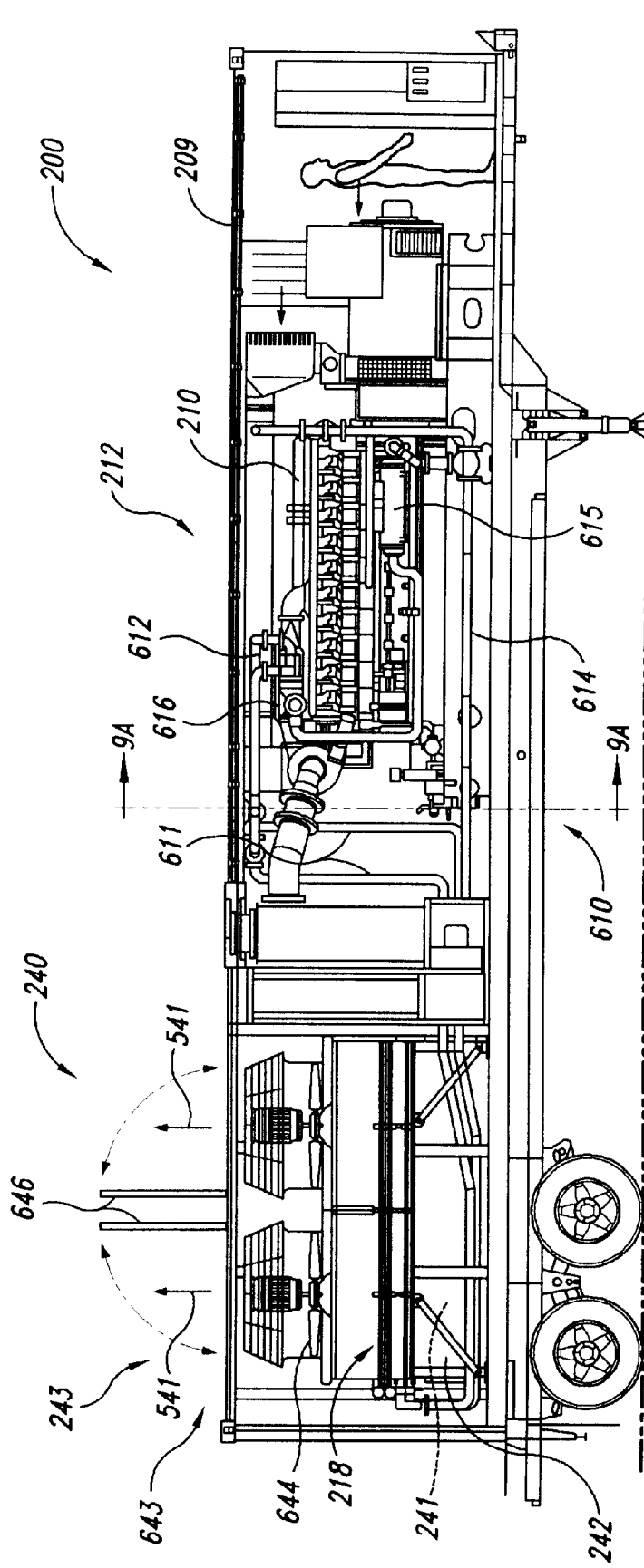
FIG. 6 is a side-elevational view of the portable power module of FIG. 2 taken substantially along line 6—6 in FIG. 2 with a side panel removed for purposes of clarity.

FIG. 5 is a top view of the portable power module 200 taken substantially along line 5—5 in FIG. 2, and FIG. 6 is a side-elevational view of the portable power module taken substantially along line 6—6 in FIG. 2. Portions of the container 202 are omitted from FIGS. 5 and 6 for purposes of clarity. Together FIGS. 5 and 6 illustrate various aspects of the second air circuit 240 in accordance with an embodiment of the invention. FIGS. 5 and 6 are at least substantially similar to FIGS. 3 and 4, respectively, except that different components may be labeled for purposes of discussion.

Referring to FIGS. 5 and 6 together, the second air circuit 240 includes a second air moving system 643 that draws a second air portion 541 horizontally through the third and fourth air inlets 241 and 242. In one embodiment, the second air moving system 643 includes two fans 644 positioned horizontally above the radiator 218. The fans 644 draw the second air portion 541 over the radiator 218 to convectively lower the temperature of coolant circulating through the radiator. After passing over the radiator 218, the second air portion 541 is discharged vertically out the second air outlet 243 (FIG. 6) located on the top portion 209 of the container 202.

As best seen in FIG. 6, the radiator 218 is connected in flow communication with a coolant circuit 610. The coolant circuit 610 includes a low temperature circuit 611 and a high temperature circuit 614. The high temperature circuit 614 circulates coolant through an oil cooler 615, an intercooler first stage 616, and the coolant jacket 212. The low temperature circuit 611 circulates coolant to an intercooler second stage 612.

In one embodiment, the second air circuit 240 includes occluding members 646 that are optionally positionable over the second air outlet 243 when the second air circuit is not in use. In the illustrated embodiment, the occluding members 646 are pivoting cover members that are pivotally attached to the top portion 209 of the container 202 adjacent to the second air outlet 243. The occluding members 646 are optionally rotatable between a substantially horizontal position in which at least a portion of the second air outlet 243 is covered to restrict ingress of rain or other substances and a substantially vertical position in which the second air outlet is substantially open to permit full discharge of the third air portion 541. In one aspect of this embodiment, electrical actuators (not shown) can be interconnected between the occluding members 646 and an adjacent structure, such as the top portion 209 of the container 202, to automatically verticate the occluding members when the motor 210 is started. Similarly, these electrical actuators can be configured to automatically rotate the occluding members 646 back into a closed position when the motor 210 is turned off.

One advantage of the second air circuit 240 as shown in FIGS. 5 and 6 is the general compactness provided by the arrangement of the respective components. For example, rather than install a motor coolant radiator on top of the container 202, the radiator 218 of the present invention is permanently installed inside the container. As a result, the radiator configuration of the present invention does not require separate transportation to a job site, nor does it require the extensive set-up and check-out procedures often associated with prior art systems.

One advantage of the portable power module 200 is the noise reduction resulting from the configuration of the first and second air circuits 230 and 240. As explained under FIGS. 3 and 4, the first air circuit 230 provides air to the motor compartment 205, and the second air circuit 240 provides air to the radiator 218. By using two air circuits instead of one, the individual air demands of each circuit are necessarily less than the total air demand would be for a single circuit that provided air to both the motor compartment 205 and the radiator 218. As a result, the air flow speeds at the first and second air inlets 231 and 232, and the third and fourth air inlets 241 and 242, can be substantially lower than prior art systems that use a single air circuit. This reduction in air speed results in a substantial reduction in air noise at the respective inlets. This reduction in air speed has the further advantage of reducing the amount of rainwater drawn into the container 202 during operation in the rain.

A further advantage of the portable power module 200 is the efficiency of radiator cooling it provides. Power generation systems of the prior art, such as those that use diesel fuel, use a single air circuit for both motor compartment and radiator cooling. As a result, with prior art systems either the radiator or the motor will not receive cool ambient air. For example, if the single air circuit first draws outside air through the motor compartment and then passes it to the radiator, then the radiator would receive preheated air. Conversely, if the air was first drawn over the radiator and then passed to the motor compartment, then the motor would receive preheated air. In contrast, the portable power module 200 of the present invention uses two dedicated air circuits, such that both the motor compartment 205 and the radiator 218 are provided with cool ambient air.

Figure 7:
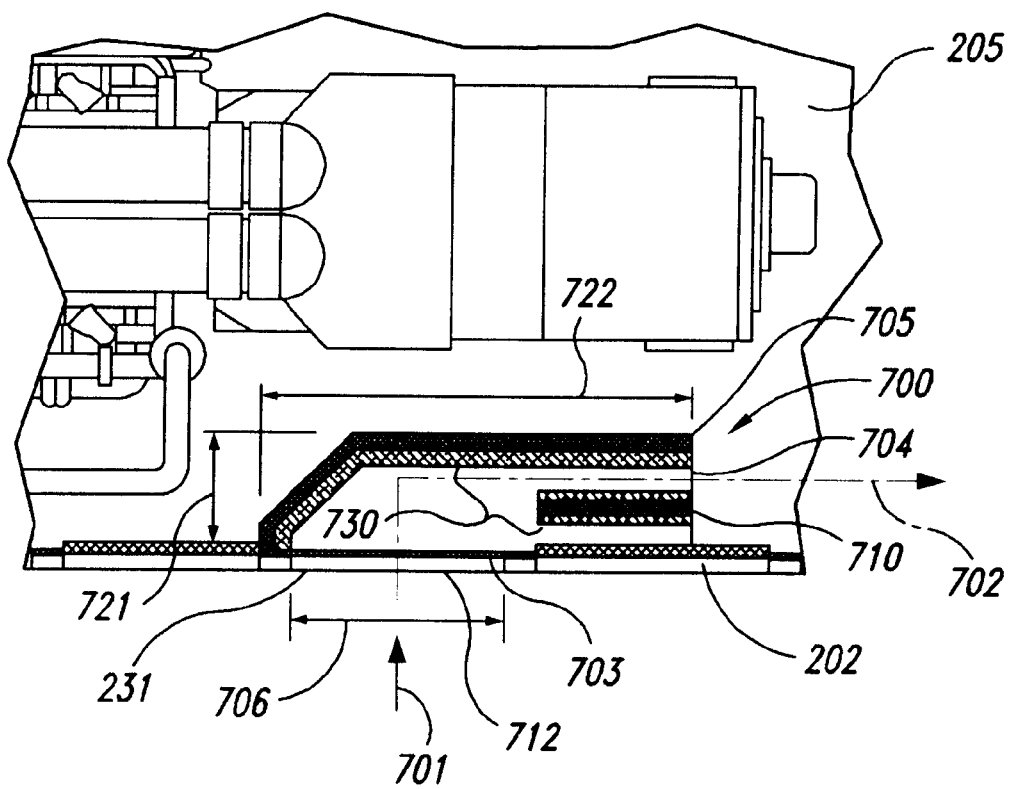
FIG. 7 is an enlarged top view of an air duct in the portable power module of FIG. 3 in accordance with an embodiment of the invention.

FIG. 7 is an enlarged top view of an air duct 700 in the portable power module of FIG. 3 in accordance with an embodiment of the invention. In the embodiment shown in FIG. 7, the air duct 700 is an air inlet duct mounted to the inside of a container, such as the container 202, in flow communication with an air inlet, such as the first air inlet 231. In one aspect of this embodiment, the air duct 700 introduces ambient air into the motor compartment 205. In other embodiments, the air duct 700 can be used in conjunction with other air inlets or other air outlets for other applications.

The air duct 700 includes a body 705 that is positionable over the first air inlet 231 to at least partially define a first opening 703 and a second opening 704. The first opening 703 is perpendicular to a first direction 701 and has an opening dimension 706. The second opening 704 is perpendicular to a second direction 702 that is at least approximately perpendicular to the first direction 701. Accordingly, air flowing into the air duct 700 through the first opening 703 undergoes approximately a 90° direction change before exiting into the motor compartment 205 through the second opening 704.

In one aspect of this embodiment, the body 705 further defines an overall first body dimension 721 in the first direction 701 and an overall second body dimension 722 in the second direction 702. In a further aspect of this embodiment, the first dimension 721 is less than the opening dimension 706, and the second dimension 722 is greater than the opening dimension. In other embodiments, the first and second dimensions 721 and 722 can have other sizes relative to the opening dimension 706.

The air duct 700 can include various features to enhance flow performance or reduce acoustic noise in accordance with the present invention. For example, the air duct 700 can include a filter member 712, such as a mesh or a grate, at least substantially disposed over the first opening 703 to prevent the ingress of foreign objects into the motor compartment 205. The air duct 700 can also include an elongate flow splitter 710 longitudinally disposed adjacent to the second opening 704 parallel to the second direction 702 to reduce acoustic noise associated with airflow. Similarly, insulation 730 can be affixed to the flow splitter 710 and to various portions of the body 705, such as the interior of the body, to further reduce acoustic noise.

A number of advantages are associated with the air duct 700. For example, the low profile of the air duct 700 relative to the cross section of the container 202 enables an operator (not shown) to move freely about the motor compartment 205 with full access to the generator 220. A second advantage of the air duct 700 is the noise attenuation characteristics it provides. The change in direction of the airflow from the first direction 701 to the second direction 702, in conjunction with the insulation 730 and the flow splitter 710, reduces the flow speed of the incoming air and absorbs the resulting acoustic noise. These features contribute to the relatively low overall sound pressure levels generated by the portable power module 200 during normal operation.

Figure 8:
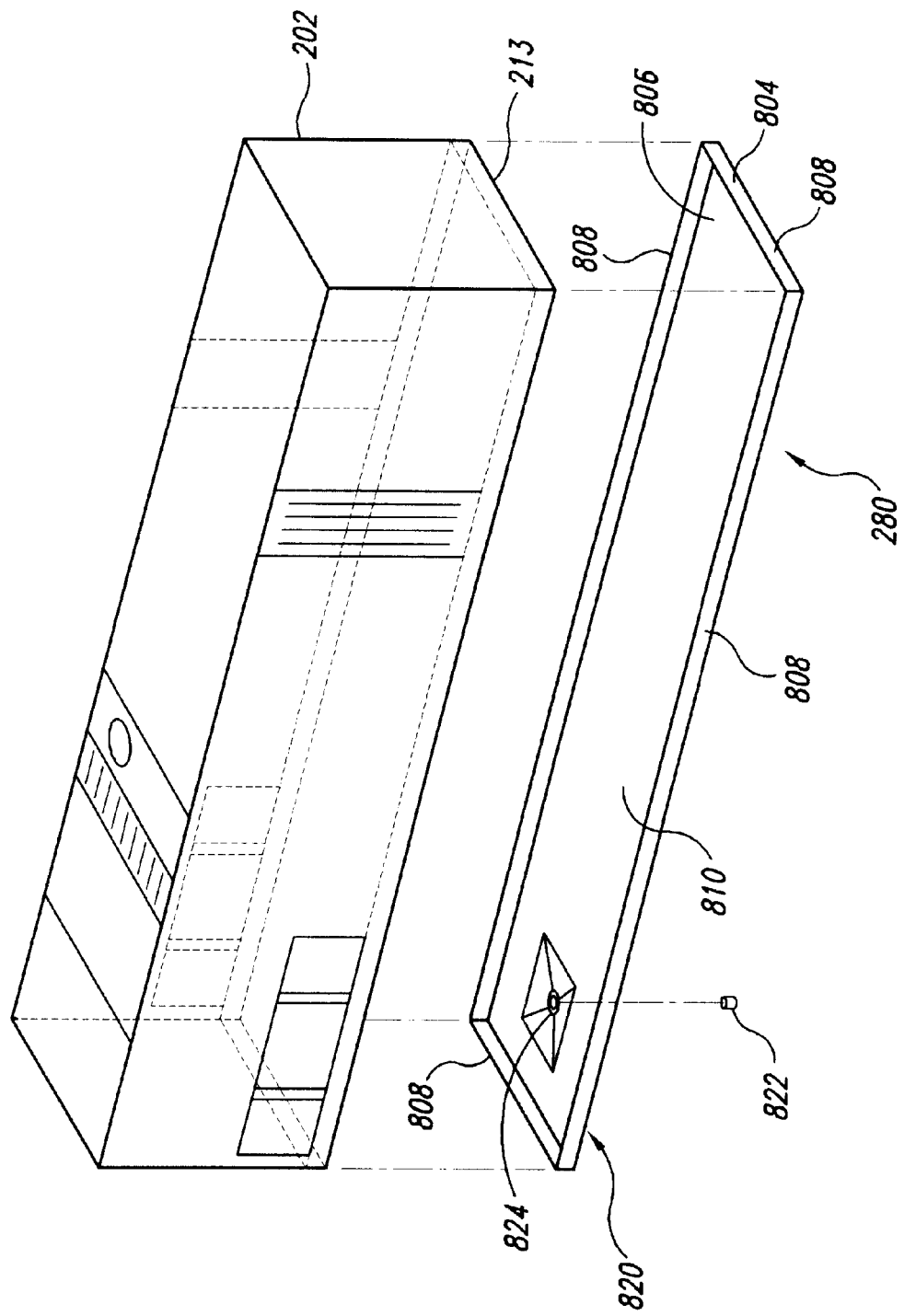
FIG. 8 is an exploded isometric view of a containment system of FIG. 2 in accordance with an embodiment of the invention.

FIG. 8 is an exploded isometric view of the containment system 280 in accordance with an embodiment of the invention. The containment system 280 includes a containment member 804 having a substantially horizontal portion 806 and a plurality of substantially vertical portions 808 that are contiguously attached to the horizontal portion around the perimeter of the horizontal portion. Accordingly, the vertical portions 808 together with the horizontal portion 806 define a containment volume 810 within the containment member 804.

The containment member 804 is shown outside the container 202 in exploded form in FIG. 8 for purposes of clarity.

In practice, however, the containment member 804 is at least generally positioned inside the container 202 adjacent to the bottom portion 213. In one aspect of this embodiment, the containment member 804 extends at least substantially over the entire bottom portion 213 inside the container 202 conforming to the interior dimensions of the container. In other embodiments, the containment member 804 can extend over less than the entire bottom portion 213. For example, the containment member 804 can be divided into two or more sections positioned in various locations around the bottom portion 213 as required to meet the needs of a particular application.

In a further aspect of this embodiment, the containment member 804 is shaped and sized so that the containment volume 810 can contain between 100 and 140 percent of the liquids on board the portable power module 200 (FIG. 2) during normal operation. For example, in one embodiment, the containment volume 810 can contain approximately 120 percent of the onboard liquids. Such liquids may include coolants, lubricants, and water that has either condensed inside the container 202 or has entered through one of the existing apertures. Accordingly, any liquid that may drain or drip from any of the components in the portable power module 200 (FIG. 2) will be contained in the container 202 in the containment member 804. In other embodiments, the containment member 804 can be shaped and sized to other criteria as required by the particular application.

In one embodiment, the containment system 280 can also include one or more drain outlets, such as a drain plug assembly 820, for draining liquids and other substances (not shown) that collect in the containment member over time. The drain plug assembly 820 includes a threaded drain plug 822 optionally threadable into a threaded drain hole 824. When the drain plug 822 is threaded into the drain hole 824, the drain plug assembly 820 is closed such that the contents of the containment member 804 are retained. When the drain plug 822 is removed from the drain hole 824, the drain plug assembly 820 is open such that the contents of the containment member 804 are allowed to drain into a suitable receptacle (not shown). In other embodiments, other types of drain outlets may be employed. For example, one or more valves or petcocks optionally positionable between open and closed positions may be affixed to the containment member 804 for draining collected contents into suitable receptacles. In yet other embodiments, the containment system 280 can be provided without any drain outlets, and thus any collected contents can be removed by other means.

Figure 9A:
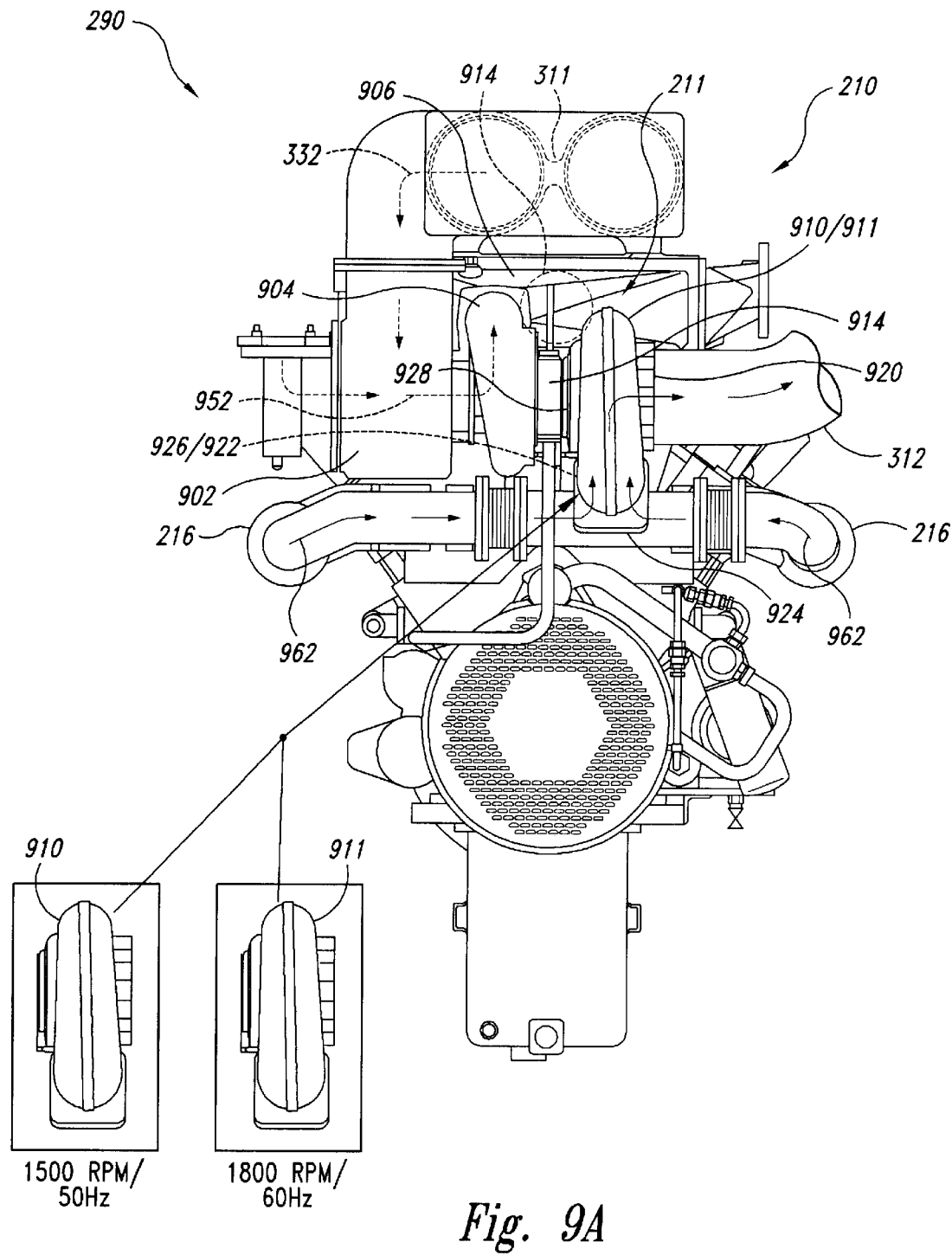
FIG. 9A is an enlarged end view of a motor of FIG. 6 taken substantially along line 9A—9A in FIG. 6 for the purpose of illustrating aspects of a frequency switching system in accordance with an embodiment of the invention.

FIG. 9A is an enlarged end view of the motor 210 taken substantially along line 9—9 in FIG. 6 for the purpose of illustrating aspects of the frequency switching system 290 in accordance with an embodiment of the invention. In one aspect of this embodiment, the frequency switching system 290 allows the frequency of electrical power provided by the generator 220 (FIGS. 2–6) to be changed by selecting an appropriate configuration for the turbocharger 211. The motor 210 includes the combustion air intake 311 that provides the second air portion 332 to an air/fuel mixer 902 to create an air/fuel mixture 952. The air/fuel mixer 902 is connected in flow communication with a driven portion 904 of the turbocharger 211. The driven portion 904 compresses the air/fuel mixture 952 received from the air/fuel mixer 902 and introduces it into an adjoining intake manifold 906. As is known to those of ordinary skill in the art of turbochargers, the pressure of the air/fuel mixture 952 being introduced into the intake manifold 906 increases as the rotational speed of the driven portion 904 increases. The air/fuel mixture 952 passes through the intake manifold 906 into respective combustion chambers in the motor 210 for combustion. Resulting exhaust gasses 962 exit the combustion chambers into the bifurcated exhaust gas manifold 216.

The turbocharger 211 includes a first driving portion 910 that is optionally interchangeable with a second driving portion 911. The exhaust gas manifold 216 is connected in flow communication with the driving portion (i.e., either the first driving portion 910 or the second driving portion 911) which is mechanically coupled to the driven portion 904 via an interconnecting bearing casing 914. Accordingly, the exhaust gasses 962 flow through the driving portion (910/911) and into the exhaust gas duct 312, thereby transferring kinetic energy to the driving portion which in turn drives the driven portion 904 and controls the pressure (or "boost" pressure) of the air/fuel mixture 952 passing through the driven portion into the intake manifold 906.

In one embodiment, the first and second driving portions 910 and 911 have housings that have structural interfaces which are at least substantially similar to each other. In this embodiment, the first and second driving portions differ in their rotor configurations. For example, the first driving portion 910 may have a first rotor configuration that rotates at a first rotor speed for a given flow rate of the exhaust gases 962, and the second driving portion 911 may have a second rotor configuration that rotates at a second rotor speed higher than the first rotor speed for the same flow rate of exhaust gases. Any increase in the rotor speed of the driving portion correspondingly increases the rotor speed of the driven portion 904, which accordingly raises the pressure of the air/fuel mixture 952 flowing into the intake manifold 906.

A change in pressure of the air/fuel mixture 952 passing from the driven portion 904 into the intake manifold 906 will change the speed of the motor 210. A change in speed of the motor 210 results in a change of speed of the generator 220, which accordingly changes the frequency of the electrical power provided by the generator. For example, in one embodiment, a motor speed of 1500 RPM results in a generator output of 50 Hz and a motor speed of 1800 RPM results in a generator output of 60 Hz. In one aspect of this embodiment as explained above, the configuration of the driving portion (e.g., either 910 or 911) controls the pressure of the air/fuel mixture 952. Accordingly, the configuration of the driving portion (910/911) can also be used to control the output frequency from the generator 220. For example, in one embodiment of the present invention, installation of the first driving portion 910 results in a motor speed of 1500 RPM corresponding to an output frequency of 50 Hz, and installation of the second driving portion 911 results in a motor speed of 1800 RPM corresponding to an output frequency of 60 Hz. Accordingly, switching from the first driving portion 910 to the second driving portion 911 will correspondingly change the generator output from 50 Hz to 60 Hz, and vice versa.

The process of switching from one driving portion to another driving portion in accordance with an embodiment of the invention will now be explained. For purposes of illustration, the first driving portion 910 will be replaced by the second driving portion 911; however, those of ordinary skill will understand that the process is the same when replacing the second driving portion with the first driving portion. Switching from the first driving portion 910 to the second driving portion 911 requires disconnecting the exhaust gas duct 312 from the first driving portion 910 at a first field joint 920. A turbocharger bypass 926 is then disconnected from the first driving portion 910 at a second field joint 922, and the exhaust gas manifold 216 is disconnected from the first driving portion at a third field joint 924.

The first driving portion 910 is then disconnected from the bearing casing 914 at a fourth field joint 928 and set aside. The process for operationally installing the second driving portion 911 is substantially the reverse of the process just described for removing the first driving portion 910.

There are a number of other ways in accordance with the prior art to change the motor speed, and hence change the generator output frequency, but they may lack the advantages of the present invention. Using a throttle valve 914 to vary the rate at which the air/fuel mixture 952 is introduced into the combustion chambers is one such approach to varying motor speed. However, this approach cannot be used to increase the motor speed if the throttle valve 914 is already in a fully opened configuration. Another method for controlling output frequency that does not involve changing the motor speed per se is to interpose a gearbox between the motor 210 and the generator 220. This approach, however, adds weight, complexity, and expense to the portable power module 200. In addition, this approach requires first developing a suitable gearbox. In contrast, the frequency switching system 290 of the present invention can switch between 50 Hz and 60 Hz generator output by the simple expedient of replacing the first driving portion 910 with the second driving portion 911.

Figure 9B:
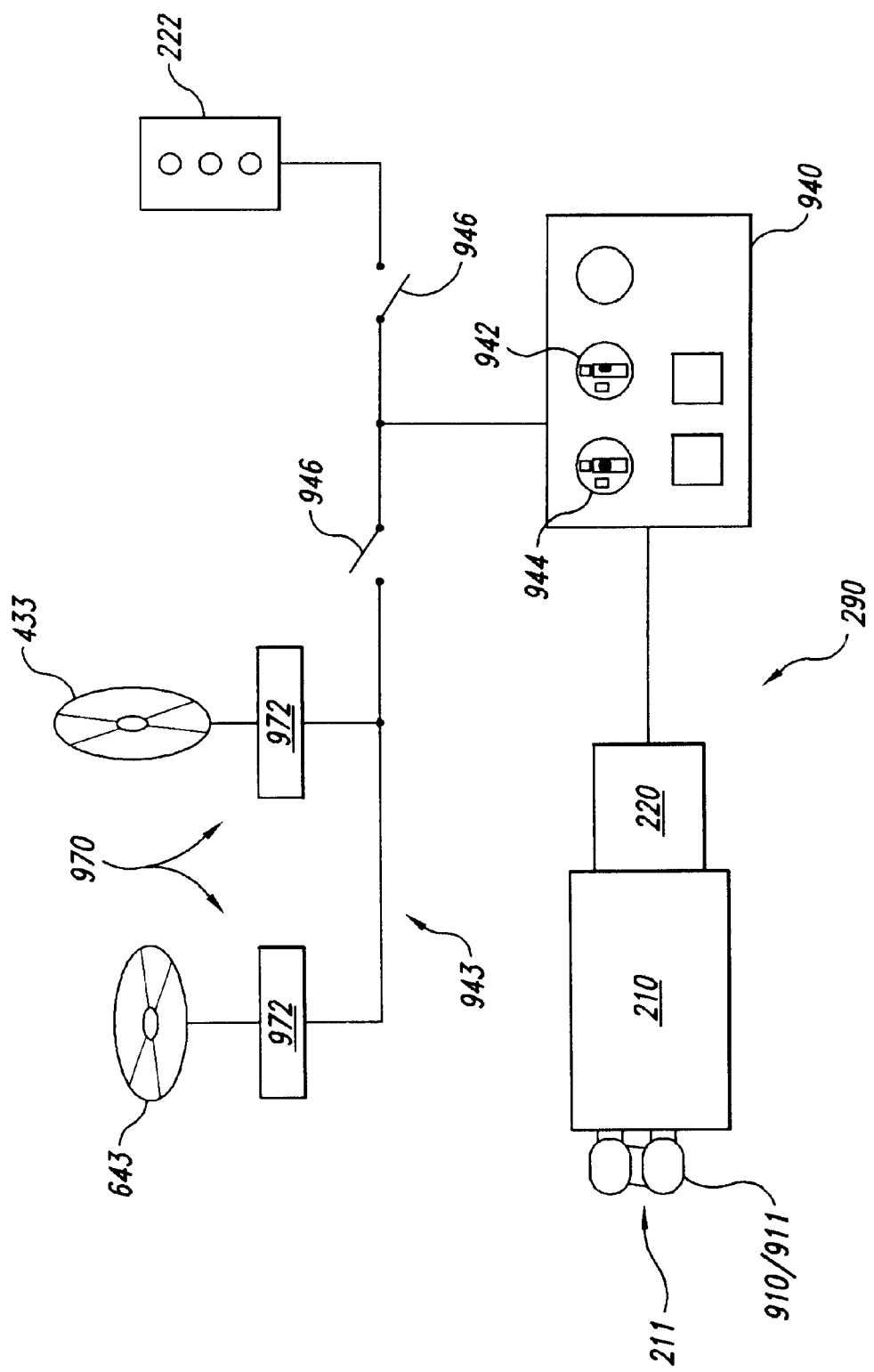
FIG. 9B is a schematic diagram illustrating electrical aspects of the frequency switching system of FIG. 9A in accordance with an embodiment of the invention.

FIG. 9B is a schematic diagram illustrating electrical aspects of the frequency switching system 290 in accordance with an embodiment of the invention. In one aspect of this embodiment, electrical power from the generator 220 passes through an electrical control system 940 before passing to either the electrical outlet 222 or to an internal grid 943. The internal grid 943 provides electrical power to one or more of the electrical systems onboard the portable power module 200 (FIG. 2), such as the first air moving system 433 and the second air moving system 633. The electrical outlet 222 provides electrical power for use external of the portable power module, such as for use fulfilling various customer needs for temporary electrical power on the order of one megawatt. One or more switches 946 can be included between the control system 940 and the internal grid 943 or the electrical outlet 222 as a further means of controlling the flow of power to these locations.

The electrical control system 940 includes a number of electrical subsystems for controlling the electrical power provided by the generator 220. Such subsystems can control the voltage, current, frequency and other aspects of this electrical power. For example, in one embodiment, the electrical control system 940 includes a voltage controller 944, such as an auxiliary transformer bypass switch, and a circuit breaker 942. In one aspect of this embodiment, the voltage controller 944 has a first position, such as a 230/240 Volt position corresponding to 400 Volt/50 Hz operation, and a second position, such as a 277 Volt position corresponding to 480 Volt/60 Hz operation. In a further aspect of this embodiment, the circuit breaker 942 has a first setting, such as a 1900 Amp setting corresponding to 400 Volt/50 Hz operation, and a second setting, such as a 1600 Amp setting corresponding to 480 Volt/60 Hz operation. In other embodiments, the control system 940 can include additional subsystems and components known to those of ordinary skill in the art for performing various functions related to the control or monitoring of the electrical power provided by the portable power module 200 (FIG. 2).

As is known by those of ordinary skill, industrial electrical systems in European countries often use voltage in the range of 380–415 Volts at 50 Hz, and industrial electrical systems in the United States often use voltage of 480 Volts at 60 Hz. In one embodiment of the invention, the portable power module 200 (FIG. 2) can be configured for use in Europe by installing the first driving portion 910 of the turbocharger 211, positioning the voltage controller 944 in the 230/240 Volt position, and setting the circuit breaker 942 at the 1900 Amp setting. In this configuration, the portable power module 200 can provide 400 Volts at 50 Hz to both the internal grid 943 and the electrical outlet 222. In another embodiment of the invention, the portable power module 200 can be configured for use in the United States by installing the second driving portion 911 of the turbocharger 211, positioning the voltage controller 944 in the 277 Volt position, and setting the circuit breaker 942 at the 1600 Amp setting. In this configuration, the portable power module 200 can provide 480 Volts at 60 Hz to both the internal grid 943 and the electrical outlet 222. In yet other embodiments, the portable power module 200 can be configured to provide electrical power of other voltages and other frequencies as required by other applications.

Electrical systems similar to those used onboard the portable power module 200 (FIG. 2), such as the first air moving system 433 and the second air moving system 633, are typically configured to operate on either 50 Hz or 60 Hz electrical power. In a further embodiment of the invention, the frequency switching system 290 includes a frequency adapting system 970 that allows these onboard systems to operate on either 50 Hz or 60 Hz power. In one aspect of this embodiment, the frequency adapting system 970 includes one or more variable speed frequency drives 972 operatively connected to the onboard electrical systems that obtain their power from the internal grid 943. The variable speed frequency drives 972 receive power from the electrical control system 940 in either 50 Hz or 60 Hz form, and adapt this power for use by the onboard electrical systems. In other embodiments, other systems can be used to adapt the electrical systems onboard the portable power module 200 for either 50 Hz or 60 Hz electrical power.

From the foregoing, it will be appreciated that specific embodiments of the invention have been described herein for purposes of illustration, but that various modifications may be made without deviating from the spirit and scope of the invention. Accordingly, the invention is not limited except by the appended claims.

I claim:

1. A method for changing the frequency of electrical power provided by a portable power module capable of providing at least approximately one megawatt of electrical power, the portable power module being trailerable over public roads and including a container and a gaseous fuel motor drivably connected to an electrical generator, the motor including a combustion chamber and a coolant jacket positioned adjacent to the combustion chamber to circulate liquid coolant, the portable power module further including a radiator connected in flow communication with the coolant jacket and an exhaust gas silencer connected in flow communication with the combustion chamber via an exhaust gas duct, the portable power module further including a turbocharger having a driving portion drivably coupled to a driven portion, the driven portion being connected in upstream flow communication with the combustion chamber and the driving portion being connected in downstream flow communication with the combustion chamber between the combustion chamber and the exhaust gas silencer, the method for changing the frequency of electrical power comprising:

determining a first frequency of electrical power provided by the portable power module in a normal operating configuration, wherein the motor, the generator, the radiator and the exhaust gas silencer are positioned inside the container when the portable power module is in a normal operating configuration;

when the first frequency is 50 Hz, disconnecting the driving portion of the turbocharger from the motor, the driving portion being a first driving portion capable of causing the motor to operate at a first speed, wherein disconnecting the first driving portion from the motor includes:

disconnecting the first driving portion from the exhaust gas duct;

disconnecting the first driving portion from a turbocharger bypass;

disconnecting the first driving portion from an exhaust gas manifold; and disconnecting the first driving portion from the driven portion;

connecting a second driving portion to the motor, the second driving portion being capable of causing the motor to operate at a second speed higher than the first speed, wherein connecting the second driving portion to the motor includes:

connecting the second driving portion to the driven portion;

connecting the second driving portion to the exhaust gas manifold;

connecting the second driving portion to the turbocharger bypass; and connecting the second driving portion to the exhaust gas duct; and operating the motor at the second speed;

when the first frequency is 60 Hz, disconnecting the driving portion of the turbocharger from the motor, the driving portion being the second driving portion capable of causing the motor to operate at the second speed, wherein disconnecting the second driving portion from the motor includes:

disconnecting the second driving portion from the exhaust gas duct;

disconnecting the second driving portion from the turbocharger bypass;

disconnecting the second driving portion from the exhaust gas manifold; and disconnecting the second driving portion from the driven portion;

connecting first driving portion to the motor, the first driving portion being capable of causing the motor to operate at the first speed lower than the second speed, wherein connecting the first driving portion to the motor includes:

connecting the first driving portion to the driven portion;

connecting the first driving portion to the exhaust gas manifold;

connecting the first driving portion to the turbocharger bypass; and connecting the first driving portion to the exhaust gas duct; and operating the motor at the first speed.

2. The method of claim 1 wherein the first speed is 1500 RPM and the second speed is 1800 RPM.

3. The method of claim 1 wherein the portable power module further includes a voltage switch electrically connected to the generator to control the electrical power provided by the generator, the voltage switch having a 400 Volt position and a 480 Volt position, wherein the method for changing the frequency of electrical power further comprises:

when the first frequency is 50 Hz, changing the position of the voltage switch from the 400 Volt position to the 480 Volt position to set the voltage of electrical power provided by the generator to approximately 480 Volts; and when the first frequency is 60 Hz, changing the position of the voltage switch from the 480 Volt position to the 400 Volt position to set the voltage of electrical power provided by the generator to approximately 400 Volts.

4. The method of claim 1 wherein the portable power module further includes a circuit breaker electrically connected to the generator to control the electrical power provided by the generator, the circuit breaker having a 1600 Amp setting and a 1900 Amp setting, wherein the method for changing the frequency of electrical power further comprises:

when the first frequency is 50 Hz, setting the circuit breaker to the 1600 Amp setting to limit the current provided by the generator to approximately 1600 Amps; and when the first frequency is 60 Hz, setting the circuit breaker to the 1900 Amp setting to limit the current provided by the generator to approximately 1900 Amps.

5. The method of claim 1 wherein the portable power module further includes a voltage switch and a circuit breaker electrically connected to the generator to control the electrical power provided by the generator, the voltage switch having a 400 Volt position and a 480 Volt position, the circuit breaker having a 1600 Amp setting and a 1900 Amp setting, wherein the method for changing the frequency of electrical power further comprises:

when the first frequency is 50 Hz, changing the position of the voltage switch from the 400 Volt position to the 480 Volt position to set the voltage of electrical power provided by the generator to approximately 480 Volts; and setting the circuit breaker at the 1600 Amp setting to limit the current to approximately 1600 Amps; and when the first frequency is 60 Hz, changing the position of the voltage switch from the 480 Volt position to the 400 Volt position to set the voltage of electrical power provided by the generator to approximately 400 Volts; and setting the circuit breaker at the 1900 Amp setting to limit the current to approximately 1900 Amps.

6. A method for changing the frequency of electrical power provided by a portable power module, the portable power module including a motor drivably connected to an electrical generator for providing electrical power at a first frequency when driven by the motor at a first motor speed, the motor including a combustion chamber configured to receive an air/fuel mixture through an intake manifold and to discharge exhaust gases through an exhaust gas manifold, the portable power module further including a turbocharger having a first driving portion drivably connected to a driven portion, the driven portion configured to pressurize the air/fuel mixture received by the combustion chamber, the first driving portion configured to drive the driven portion by interaction with the exhaust gases discharging from the combustion chamber, the method for changing the frequency of electrical power comprising:

changing the first motor speed to a second motor speed by replacing the first driving portion of the turbocharger with a second driving portion, the first driving portion being replaced with the second driving portion by a method including the steps of:

disconnecting the first driving portion of the turbocharger from the driven portion, and drivably connecting the second driving portion to the driven portion.

7. The method of claim 6 wherein changing the first motor speed to a second motor speed includes one of:
changing the first motor speed of 1500 RPM to a second motor speed of 1800 RPM to correspondingly change the frequency of electrical power from 50 Hz to 60 Hz; and
changing the first motor speed of 1800 RPM to a second motor speed of 1500 RPM to correspondingly change the frequency of electrical power from 60 Hz to 50 Hz.

8. The method of claim 6 wherein the portable power module further includes one or more throttle valves for controlling the amount of the air/fuel mixture received by the combustion chamber, wherein the generator provides electrical power at the first frequency when driven by the motor at the first motor speed when the one or more throttle valves are in a first position, and wherein the method for changing the frequency of electrical power further comprises:
maintaining the motor speed and the generator speed in a one-to-one correspondence; and
maintaining the one or more throttle valves in the first position.

9. The method of claim 6 wherein the first driving portion is replaced with the second driving portion by the method further including the steps of:
disconnecting the first driving portion from an exhaust gas duct;
disconnecting the first driving portion from a turbocharger bypass;
disconnecting the first driving portion from the exhaust gas manifold;
connecting the second driving portion to the exhaust gas manifold;
connecting the second driving portion to the turbocharger bypass; and
connecting the second driving portion to the exhaust gas duct.

10. The method of claim 6 wherein the portable power module further includes a voltage switch and a circuit breaker electrically connected to the generator to control the electrical power provided by the generator, the voltage switch having a 400 Volt position and a 480 Volt position, the circuit breaker having a 1600 Amp setting and a 1900 Amp setting, wherein the method for changing the frequency of electrical power further comprises at least one of:
changing the position of the voltage switch from the 400 Volt position to the 480 Volt position to set the voltage of electrical power provided by the generator to approximately 480 Volts;
changing the setting of the voltage switch from the 480 Volt setting to the 400 Volt setting to set the voltage of electrical power provided by the generator to approximately 400 Volts;
setting the circuit breaker at the 1600 Amp setting to limit the current to approximately 1600 Amps; and
setting the circuit breaker at the 1900 Amp setting to limit the current to approximately 1900 Amps.

11. A method for changing the frequency of electrical power provided by a portable power module, the portable power module including a motor drivably connected to an electrical generator to operate in one-to-one correspondence, the motor including a combustion chamber configured to receive an air/fuel mixture through a turbocharger and one or more throttle valves, the position of the one or more throttle valves controlling the amount of the air/fuel mixture received by the combustion chamber, the generator providing electrical power at a first frequency when operated at a first RPM and a second frequency when operated at a second RPM, the method for changing the frequency of electrical power comprising:
maintaining the motor speed and the generator speed in one-to-one correspondence;
maintaining the one or more throttle valves in a fixed position; and
changing the first RPM to the second RPM by reconfiguring the turbocharger.

12. The method of claim 11 wherein the turbocharger has a first driving portion drivably connected to a driven portion, the driven portion configured to pressurize the air/fuel mixture received by the combustion chamber, the first driving portion configured to drive the driven portion by interaction with exhaust gases discharging from the combustion chamber, and wherein reconfiguring the turbocharger includes replacing the first driving portion of the turbocharger with a second driving portion, the first driving portion being replaced with the second driving portion by a method including the steps of:
disconnecting the first driving portion of the turbocharger from the driven portion, and
drivably connecting the second driving portion to the driven portion.

13. The method of claim 11 wherein changing the first RPM to the second RPM includes one of:
changing 1500 RPM to 1800 RPM to correspondingly change the frequency of electrical power from 50 Hz to 60 Hz; and
changing 1800 RPM to 1500 RPM to correspondingly change the frequency of electrical power from 60 Hz to 50 Hz.

14. A portable power module trailerable over public roads and capable of providing at least approximately one megawatt of electrical power in a normal operating configuration, the portable power module comprising:
a container defining a first interior portion and a second interior portion, the container including a first side portion spaced apart from an opposing second side portion and a bottom portion spaced apart from an opposing top portion, the bottom and top portions being at least partially interposed between the first and second side portions;
a gaseous fuel motor positioned within the first interior portion, the motor having a combustion air intake in flow communication with a combustion chamber and a coolant jacket positioned adjacent to the combustion chamber to circulate liquid coolant;
an electrical generator positioned within the first interior portion and drivably connected to the motor to produce at least one megawatt of electrical power at a first frequency when driven by the motor at a first speed and at a second frequency when driven by the motor at a second speed, the generator including a generator air intake configured to receive cooling air;
a radiator positioned within the second interior portion in flow communication with the coolant jacket, the radiator configured to receive the liquid coolant from the coolant jacket and return the coolant to the coolant jacket;
an exhaust gas silencer positioned within the container and having an exhaust gas outlet positioned on the top portion of the container, the exhaust gas silencer connected in flow communication with the combustion chamber and configured to receive exhaust gases from the combustion chamber and vertically discharge the exhaust gases through the exhaust gas outlet; and a frequency switching system to change from the first frequency to the second frequency and vice versa, the frequency switching system including a turbocharger optionally configurable in a first configuration or a second configuration, the first configuration including a first driving portion drivably coupled to a driven portion, the second configuration including a second driving portion interchangeable with the first driving portion drivably coupled to the driven portion, the driven portion being connected in upstream flow communication with the combustion chamber, the first and second driving portions being connectable in downstream flow communication with the combustion chamber between the combustion chamber and the exhaust gas silencer.

15. The portable power module of claim 14 wherein the generator provides electrical power to an electrical system onboard the portable power module, and wherein the frequency switching system further includes:

a voltage switch electrically connected to the generator for controlling the voltage provided by the generator;

a circuit breaker electrically connected to the generator for controlling the amperage provided by the generator; and a variable speed frequency drive for adapting the electrical system onboard the portable power module to the frequency of electrical power provided by the generator.

16. The portable power module of claim 14 wherein the frequency switching system further includes:

a voltage switch electrically connected to the generator, the voltage switch having a 400 Volt position and a 480 Volt position; and a circuit breaker electrically connected to the generator, the circuit breaker having a 1600 Amp setting and a 1900 Amp setting, wherein the portable power module provides approximately 400 Volts at a frequency of 50 Hz when the voltage switch is positioned to the 400 Volt position and the circuit breaker is set to the 1900 Amp setting, and wherein the portable power module provides approximately 480 Volts at a frequency of approximately 60 Hz when the voltage switch is positioned to the 480 Volt position and the circuit breaker is set to the 1600 Amp setting.

17. The portable power module of claim 14 wherein the container has an overall length dimension of about 40 feet or less, an overall width dimension of about 8 feet or less, and an overall height dimension of about 8.5 feet or less.

18. The portable power module of claim 14 wherein the combustion chamber is configured to combust a fuel mixture comprising natural gas.

19. The portable power module of claim 14 wherein the generator produces at least approximately one megawatt of electrical power at 50 Hz when the turbocharger is in the first configuration, and wherein the generator produces at least approximately one megawatt of electrical power at 60 Hz when the turbocharger is in the second configuration.

20. The portable power module of claim 14 wherein the generator operates at approximately 1500 RPM and produces at least approximately one megawatt of electrical power at 50 Hz when the turbocharger is in the first configuration, and wherein the generator operates at approximately 1800 RPM and produces at least approximately one megawatt of electrical power at 60 Hz when the turbocharger is in the second configuration.

21. The portable power module of claim 14 further comprising a trailer supporting the container and its contents, the trailer having a tandem axle rear wheel-set and a forward coupling, the coupling being releasably attachable to a transport vehicle for movement of the portable power module.

22. The portable power module of claim 14 further comprising:

a first air circuit including a first air inlet positioned on the container adjacent to the first interior portion to provide an ambient first air portion to the first interior portion at least substantially to the exclusion of the second interior portion; and a second air circuit including a second air inlet positioned on the container adjacent to the second interior portion to provide an ambient second air portion to the second interior portion at least substantially to the exclusion of the first interior portion.

23. The portable power module of claim 22 wherein the first air inlet is positioned on one of the first or second side portions, wherein the second air inlet is positioned on one of the first or second side portions, and wherein the portable power module further comprises:

a first air outlet positioned on the top portion of the container to vertically discharge at least a fraction of the first air portion; and a second air outlet positioned on the top portion of the container to vertically discharge at least a fraction of the second air portion.

24. The portable power module of claim 22 wherein the first air portion provides ambient air to the combustion air intake and the generator air intake, and wherein the second air portion provides ambient air proximate to the radiator to cool the coolant received from the coolant jacket.

25. The portable power module of claim 22 wherein the first air inlet is positioned on one of the first or second side portions, wherein the second air inlet is positioned on one of the first or second side portions, and wherein the portable power module further comprises:

a first air outlet positioned on the top portion of the container to vertically discharge at least a fraction of the first air portion;

a second air outlet positioned on the top portion of the container to vertically discharge at least a fraction of the second air portion;

a first air moving system, the first air moving system including a first fan positioned in flow communication with the first air outlet to move at least a fraction of the first air portion from the first interior portion through the first air outlet; and a second air moving system, the second air moving system including a horizontally situated second fan in flow communication with the second air outlet to move at least a fraction of the second air portion from the second interior portion, over the radiator, and through the second air outlet.

26. The portable power module of claim 22 wherein the first air inlet is positioned on one of the first or second side portions, wherein the second air inlet is positioned on one of the first or second side portions, and wherein the portable power module further comprises:

a first air outlet positioned on the top portion of the container to vertically discharge at least a fraction of the first air portion;

a second air outlet positioned on the top portion of the container to vertically discharge at least a fraction of the second air portion;

a first air moving system, the first air moving system including a first fan positioned in flow communication with the first air outlet to move at least a fraction of the first air portion from the first interior portion through the first air outlet, the first fan configured to receive electrical power from the generator;

a second air moving system, the second air moving system including a horizontally situated second fan in flow communication with the second air outlet to move at least a fraction of the second air portion from the second interior portion, over the radiator, and through the second air outlet, the second fan configured to receive electrical power from the generator;

a first variable speed frequency drive electrically interconnected between the generator and the first fan to adapt the first fan to the frequency of electrical power provided by the generator; and a second variable speed frequency drive electrically interconnected between the generator and the second fan to adapter the second fan to the frequency of electrical power provided by the generator.

\* \* \* \* \*